(12) United States Patent
Tsau

(10) Patent No.: US 12,405,605 B2
(45) Date of Patent: Sep. 2, 2025

(54) PROCESS CAPABILITY INDEX WARNING SYSTEM AND WARNING METHOD FOR THE SAME

(71) Applicant: PEGATRON CORPORATION, Taipei (TW)

(72) Inventor: Chang-Sheng Tsau, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 394 days.

(21) Appl. No.: 18/129,947

(22) Filed: Apr. 3, 2023

(65) Prior Publication Data

US 2023/0359190 A1 Nov. 9, 2023

(30) Foreign Application Priority Data

May 4, 2022 (TW) .................................. 111116745

(51) Int. Cl.
*G05B 23/00* (2006.01)
*G05B 23/02* (2006.01)

(52) U.S. Cl.
CPC ........ *G05B 23/027* (2013.01); *G05B 2223/02* (2018.08)

(58) Field of Classification Search
CPC .............. G05B 23/027; G05B 2223/02; G05B 23/0235; G06Q 10/06393; G06Q 10/04; G06Q 50/04
See application file for complete search history.

(56) References Cited

U.S. PATENT DOCUMENTS

| | | | |
|---|---|---|---|
| 2011/0060569 A1* | 3/2011 | Lynn ................... | G06F 11/0739 703/6 |
| 2019/0034516 A1 | 1/2019 | Jiang et al. | |
| 2019/0265088 A1* | 8/2019 | Natsumeda ............. | G01D 3/08 |

FOREIGN PATENT DOCUMENTS

| | | |
|---|---|---|
| CN | 201623991 A | 7/2016 |
| CN | 110675068 A | 1/2020 |
| CN | 113052416 A | 6/2021 |
| CN | 113552800 A | 10/2021 |
| TW | 201732643 A | 9/2017 |

* cited by examiner

*Primary Examiner* — Julio C. Gonzalez
(74) *Attorney, Agent, or Firm* — Li & Cai Intellectual Property (USA) Office

(57) ABSTRACT

A process capability index warning system and a warning method for the same are provided. The system includes a process capability index calculation device, which determines whether a quantity of test samples of the test device within a cycle of a warning interval is less than a quantity threshold. When the quantity of the test samples is less than the quantity threshold, the quantity of the test samples is accumulated until an end of a next cycle of the warning interval. When the quantity of the test samples is not less than the quantity threshold, the process capability index calculation device calculates and obtains process capability index values, and determines whether or not the process capability index values are less than an index threshold. When any of the process capability index values is less than the index threshold, the process capability index calculation device sends a warning message.

10 Claims, 5 Drawing Sheets

PROCESS CAPABILITY INDEX WARNING SYSTEM AND WARNING METHOD FOR THE SAME

CROSS-REFERENCE TO RELATED PATENT APPLICATION

This application claims the benefit of priority to Taiwan Patent Application No. 111116745, filed on May 4, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a warning system and a warning method for the same, and more particularly to a process capability index warning system and a warning method for the same.

BACKGROUND OF THE DISCLOSURE

The process capability index (CPK) is used in the industry to evaluate process capability of production throughput for a production equipment. Test values are obtained by performing multiple tests on the production equipment with a large quantity of test samples. The process capability index of the production equipment is calculated based on the obtained test values. If the obtained process capability index is lower than a preset threshold, it may indicate that the process capability of the production equipment is inefficient. In this case, an operator must update process parameters of the production equipment to improve the production throughput for the production equipment.

However, when there is an insufficient quantity of test samples the process capability index may have noticeable deviation, such that the actual condition of the production equipment may not be reflected.

SUMMARY OF THE DISCLOSURE

In response to the above-referenced technical inadequacies, the present disclosure provides a process capability index warning system and a warning method for the same.

In one aspect, the present disclosure provides a process capability index warning system. The process capability index warning system is adapted to monitor a test device configured to execute a plurality of test items. The process capability index warning system includes a warning parameter setting device and a process capability index calculation device. The warning parameter setting device is configured to set a quantity threshold, a warning interval and an index threshold. The process capability index calculation device is communicatively connected to the warning parameter setting device. The process capability index calculation device determines whether or not a quantity of test samples of the test device within a present cycle of the warning interval is less than the quantity threshold. When the quantity of the test samples within the present cycle of the warning interval is less than the quantity threshold, the process capability index calculation device accumulates the quantity of the test samples until an end of the next cycle of the warning interval. When the quantity of the test samples is not less than the quantity threshold, the process capability index calculation device calculates and obtains a plurality of process capability index values that corresponds to the plurality of test items. When at least one of the process capability index values is less than the index threshold, the process capability index calculation device sends a warning message.

In another aspect, the present disclosure provides a warning method for a process capability index warning system for monitoring a test device configured to execute a plurality of test items. The method includes: setting, by a warning parameter setting device, a quantity threshold, a warning interval and an index threshold; determining, by a process capability index calculation device, whether or not a quantity of test samples of the test device within a present cycle of the warning interval is less than the quantity threshold; accumulating, by the process capability index calculation device, the quantity of the test samples until an end of a next cycle of the warning interval in response to the quantity of the test samples being less than the quantity threshold; calculating and obtaining, by the process capability index calculation device, a plurality of process capability index values that corresponds to the plurality of test items in response to the quantity of the test samples being greater than or equal to the quantity threshold; and determining, by the process capability index calculation device, whether or not the plurality of process capability index values is all greater than or equal to the index threshold. When at least one of the process capability index values is less than the index threshold, the process capability index calculation device sends a warning message.

In the past, an insufficient quantity of test samples may cause an occasional poor performance for a production equipment which may have excellent performance in the long-term, resulting in serious deviation of the CPK value. Therefore, in the process capability index warning system and the warning method for the same provided by the present disclosure, the CPK value is calculated only after sufficient test samples are obtained over long-term collection, and thus the obtained CPK value more accurately reflects a current performance of the production equipment.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
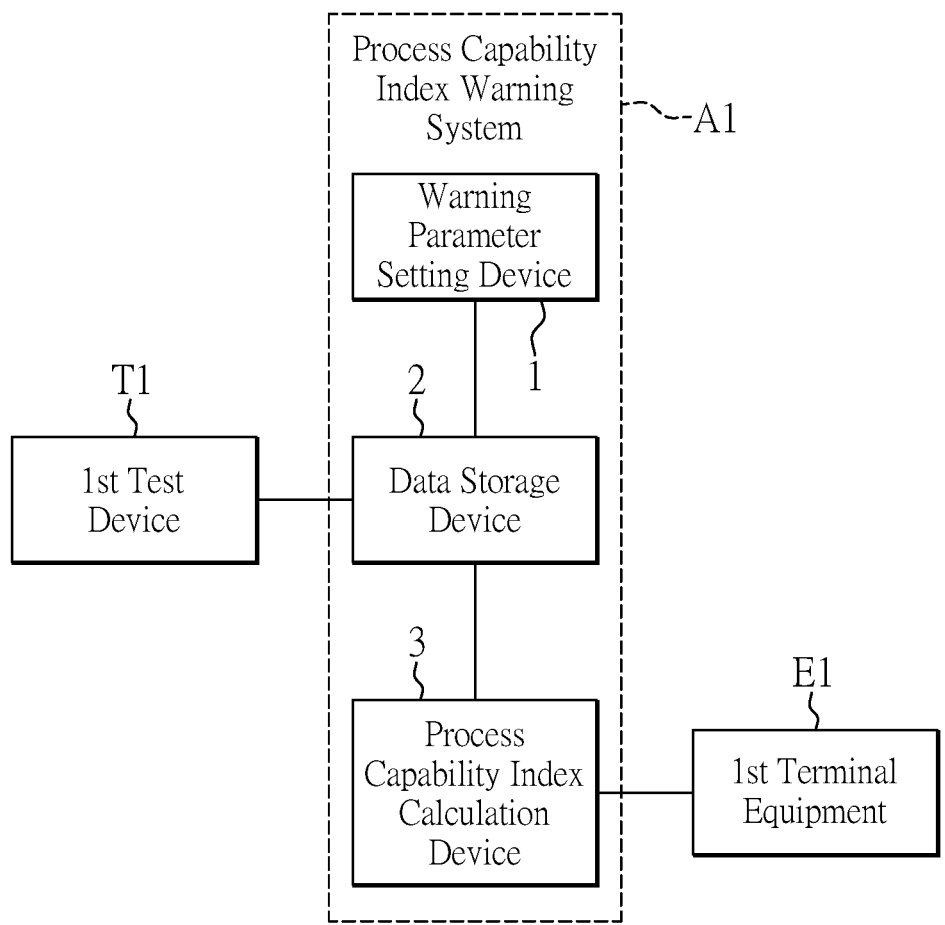
FIG. 1 is a schematic diagram of a process capability index warning system according to a first embodiment of the present disclosure.

FIG. 1 is a schematic diagram of a process capability index warning system according to a first embodiment of the present disclosure. Referring to FIG. 1, a process capability index warning system A1 includes a warning parameter setting device 1, a data storage device 2 and a process capability index calculation device 3. The warning parameter setting device 1, the data storage device 2 and the process capability index calculation device 3 communicate with one another. The warning parameter setting device 1, the data storage device 2 and the process capability index calculation device 3 are, for example, servers, personal computers, laptop computers or tablet computers, so as to realize the following functional operations.

A user may register a first test device T1 and a first terminal equipment E1 capable of receiving a warning message and set a warning interval, a quantity threshold, and an index threshold. The first test device T1 is configured to execute a plurality of test items according to a plurality of first test device parameters. The first test device T1 is communicatively connected to the data storage device 2. The first test device T1 sends the first test device parameters to the data storage device 2. In addition, the first test device T1 sends one or more test samples to the data storage device 2 in each cycle of the warning interval. The data storage device 2 stores the test samples of the first test device T1. The first terminal equipment E1 is, for example, a mobile phone, a computer host or a tablet computer operated by a first operator.

The process capability index calculation device 3 monitors the quantity of the test samples sent by the first test device T1 within a cycle of the warning interval and determines whether or not the quantity of test samples is less than the quantity threshold. When the quantity of the test samples within the present cycle of the warning interval is less than the quantity threshold, the process capability index calculation device accumulates the test samples until an end of the next cycle of the warning interval and continues to monitor the quantity of the test samples sent from the first test device T1 within another cycle after the next cycle of the warning interval. When the quantity of the test samples of the first test device T1 within the present cycle of the warning interval is not less than the quantity threshold, the process capability index calculation device calculates and obtains the process capability index values of all test items of the first test device T1 and determines whether or not the obtained process capability index values are all greater than or equal to the index threshold. When at least one the process capability index value of the first test device T1 is less than the index threshold, the process capability index calculation device 3 sends a first warning message to the first terminal equipment E1, and the first warning message includes the test items with the process capability index values less than the index threshold and all of the first test device parameters corresponding to those test items. For example, the first test device T1 is configured to execute a first test item and a second test item. When a process capability index value of the first test item is less than the index threshold and a process capability index value of the second test item is greater than or equal to the index threshold, the first warning message includes the first test item, the process capability index value of the first test item, and all the first test device parameters corresponding to the first test item. The first warning message does not include the second test item and the process capability index value of the second test item.

For example, the warning interval is set as a fixed time interval every day, such as from 8:00 to 17:00 every day, and the quantity threshold is 100. The process capability index calculation device 3 has monitored 20 test samples sent from the first test device T1 within the first cycle of the warning interval. Since the quantity of test samples of the first test device T1 within the first cycle of the warning interval does not reach the quantity threshold, the process capability index calculation device 3 accumulates the test samples until the end of the second cycle of the warning interval. In the second cycle of the warning interval, the process capability index calculation device 3 has monitored 90 test samples sent from the first test device T1. Therefore, the quantity of the test samples within the first warning interval and the second warning interval is accumulated to 110, which is greater than the quantity threshold. Furthermore, the process capability index calculation device 3 calculates and obtains the process capability index value of each test item of the first test device T1 and determines whether or not each process capability index is greater than or equal to the index threshold. When at least one test process capability index value of the first test device T1 is less than the index threshold, the process capability index calculation device 3 sends a warning message to the registered terminal equipment. When the user of the terminal device sees the warning message, the user may analyze the poor process capability index values in advance.

For another example, the warning interval can be an unfixed time interval every day. For example, a first cycle of the warning interval is from 8:00 to 12:00 on a first day, a second cycle of the warning interval is from 0:00 to 6:00 on a second day, and a third cycle of the warning interval is from 9:00 to 14:00 on a third day. In this example, the quantity threshold can be set to 200. In the first cycle of the warning interval, the process capability index calculation device 3 has monitored 50 test samples sent from the first test device T1. Since the quantity of test samples of the first test device T1 within the first cycle of the warning interval does not reach the quantity threshold, the process capability index calculation device 3 accumulates the test samples until an end of the second cycle of the warning interval. In the second cycle of the warning interval, the process capability index calculation device 3 has monitored 100 test samples sent from the first test device T1. Since a sum of the test samples within the first cycle and the second cycle of the warning interval is 150, which again fails to reach the quantity threshold, the process capability index calculation device 3 accumulates the test samples until an end of a third cycle of the warning interval. In the third cycle of the warning interval, the process capability index calculation device 3 has monitored 80 test samples sent from the first test device T1. Since the quantity of the test samples within the first cycle, the second cycle and the third cycle of the warning interval is 230, which exceeds the quantity threshold. Therefore, the process capability index calculation device 3 calculates and obtains the process capability index value of each test item of the first test device T1 and determines whether or not each process capability index is greater than or equal to the index threshold. When the process capability index value of at least one the test item of the first test device T1 is less than the index threshold, the process capability index calculation device 3 sends a warning message to the registered terminal equipment. When the user of the terminal device sees the warning message, poor process capability index values may be analyzed in advance.

Figure 2:
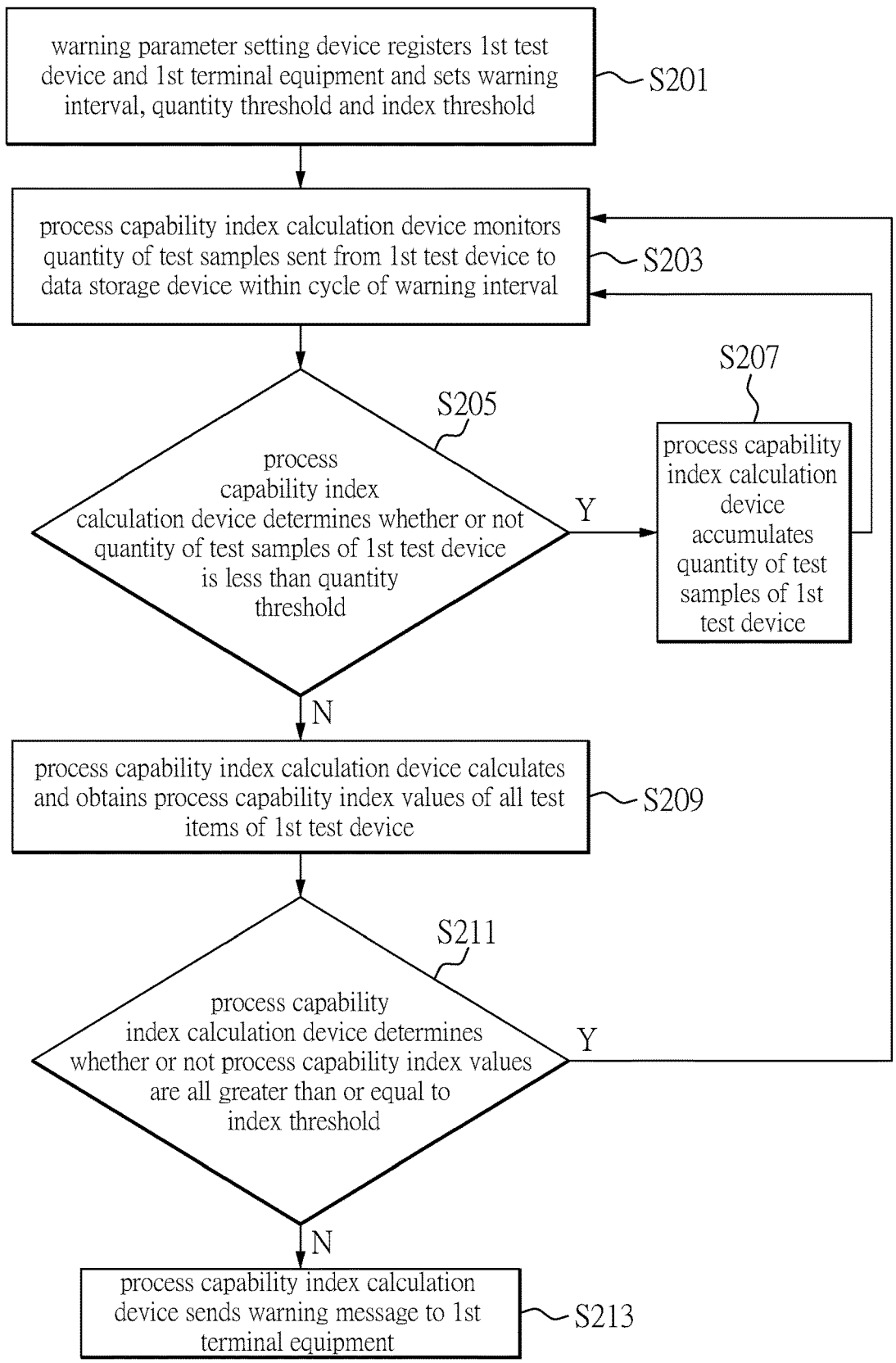
FIG. 2 is a flowchart of a warning method for the process capability index warning system of FIG. 1.

FIG. 2 is a flowchart of a warning method for the process capability index warning system of FIG. 1. As shown in FIG. 2, in step S201, the warning parameter setting device 1 registers the first test device T1 and the first terminal equipment E1 and sets the warning interval, the quantity threshold and the index threshold. In step S203, the process capability index calculation device 3 monitors the quantity of the test samples sent from the first test device T1 to the data storage device 2 within a cycle of the warning interval. In step S205, the process capability index calculation device 3 determines whether or not the quantity of the test samples of the first test device T1 is less than the quantity threshold. When the quantity of the test samples of the first test device T1 is less than the quantity threshold, the warning method proceeds to step S207. When the quantity of the test samples of the first test device T1 is not less than the quantity threshold, the warning method proceeds to step S209.

In step S207, the process capability index calculation device 3 accumulates the quantity of the test samples of the first test device T1, and then the warning method returns to step S203.

In step S209, the process capability index calculation device 3 calculates and obtains the process capability index values of all test items of the first test device T1. In step S211, the process capability index calculation device 3 determines whether or not the process capability index values are all greater than or equal to the index threshold. When the process capability index values of the first test device T1 are all greater than or equal to the index threshold, the warning method returns to step S203.

When at least one of the process capability index values of the first test device T1 is less than the index threshold, the warning method proceeds to step S213. In step S213, the process capability index calculation device 3 sends a warning message to the first terminal equipment E1, and the warning message includes the test items with the process capability index value less than the index threshold and all corresponding first test device parameters.

Figure 3:
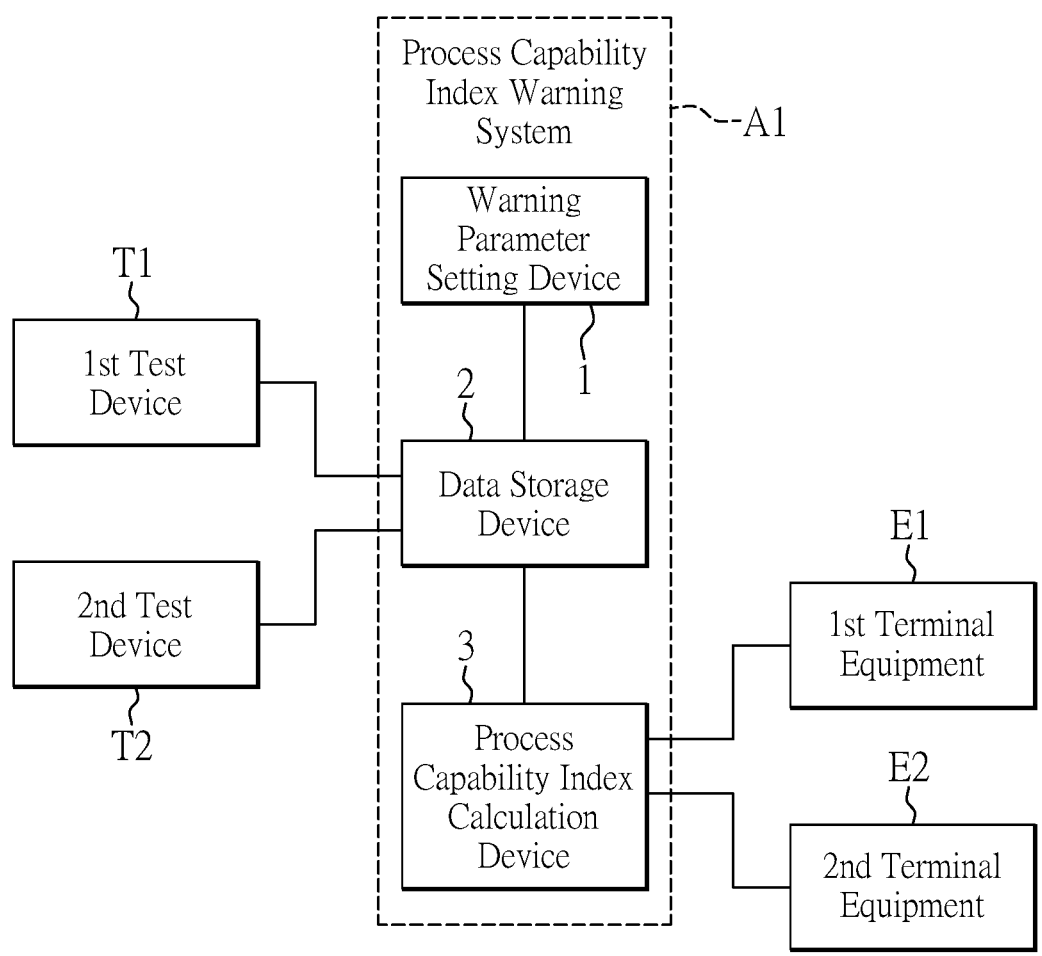
FIG. 3 is a schematic diagram of another operational scenario of the process capability index warning system of FIG. 1.

FIG. 3 is a schematic diagram of another operational scenario of the process capability index warning system of FIG. 1. Comparing FIG. 3 with FIG. 1, the warning parameter setting device 1 further registers a second test device T2 and a second terminal equipment E2. The second test device T2 is configured to execute a plurality of test items according to a plurality of second test device parameters, and the second test device T2 is communicatively connected to the data storage device 2. The second test device T2 sends the second test device parameters to the data storage device 2. In addition, the second test device T2 sends one or more test samples to the data storage device 2 in each cycle of the warning interval. The data storage device 2 stores the test samples sent from the second test device T2. The second terminal equipment E2 is, for example, a mobile phone, a computer host or a tablet computer used by a second operator.

The process capability index calculation device 3 monitors quantities of the test samples sent by the first test device T1 and the second test device T2 within a cycle of the warning interval and independently determines whether or not the quantity of the test samples of the first test device T1 and the quantity of the second test device T2 are less than the quantity threshold. When the quantity of the test samples of the first test device T1 of the warning is less than the quantity threshold, the process capability index calculation device 3 accumulates the quantity of the test samples of the first test device T1 until an end of the next cycle of the warning interval and continues to monitor the quantity of the test samples sent from the first test device T1 within another cycle after the next cycle of the warning interval. When the quantity of the test samples of the first test device T1 is not less than the quantity threshold, the process capability index calculation device calculates and obtains process capability index values of all test items of the first test device T1 and determines whether or not the obtained process capability index values are all greater than or equal to the index threshold. When the process capability index value of at least one test item of the first test device T1 is less than the index threshold, the process capability index calculation device 3 sends warning messages to the first terminal equipment E1 and the second terminal equipment E2 both, and each of the warning messages includes the test items with the process capability index values less than the index threshold and all of the first test device parameters corresponding to those test items.

Similarly, when the quantity of the test samples of the second test device T2 is less than the quantity threshold, the process capability index calculation device 3 accumulates the quantity of the test samples of the second test device T2 until an end of the next cycle of the warning interval and keeps monitoring the quantity of test samples sent from the second test device T2 within another cycle after the next cycle of the warning interval. When the quantity of the test samples of the second test device T2 is not less than the quantity threshold, the process capability index calculation device calculates and obtains process capability index values of all test items of the second test device T2 and determines whether or not the obtained process capability index values are all greater than or equal to the index threshold. When the process capability index value of at least one test item of the second test device T2 is less than the index threshold, the process capability index calculation device 3 sends warning messages to the first terminal equipment E1 and the second terminal equipment E2 both, and each of the warning messages includes the test items with the process capability index values less than the index threshold and all of the second test device parameters corresponding to those test items.

For example, the warning interval is set as a fixed time interval every day, such as from 9:00 to 16:00 every day, and the quantity threshold is 100. The process capability index calculation device 3 has monitored 20 test samples sent by the first test device T1 and 40 test samples sent by the second test device T2 within the first cycle of the warning interval. Since the quantities of the test samples of the first test device T1 and the second test device T1 within the first cycle of the warning interval both do not reach the quantity threshold, the process capability index calculation device 3 accumulates the quantity of the test samples of the first test device T1 and the quantity of the test samples of the second test device T2 until an end of a second cycle of the warning interval. The process capability index calculation device 3 has monitored 60 test samples sent by the first test device T1 and 80 test samples sent by the second test device T2 within the second cycle of the warning interval. For the first test device T1, a sum of the test samples within the first cycle and the second cycle of the warning interval is 80, which fails to reach the quantity threshold. Therefore, the process capability index calculation device 3 accumulates the quantity of the test samples of the first test device T1 until an end of a third cycle of the warning interval. For the second test device T1, a sum of the test samples within the first cycle and the second cycle of the warning interval is 120, which exceeds the quantity threshold. Therefore, the process capability index calculation device 3 calculates and obtains the process capability index value of each test item of the second test device T2 and determines whether or not each process capability index is greater than or equal to the index threshold. When the process capability index value of at least one test item of the second test device T2 is less than the index threshold, the process capability index calculation device 3 sends warning messages to the registered terminal equipment. When the user of the terminal device sees the warning message, poor process capability index values may be analyzed in advance.

Figure 4:
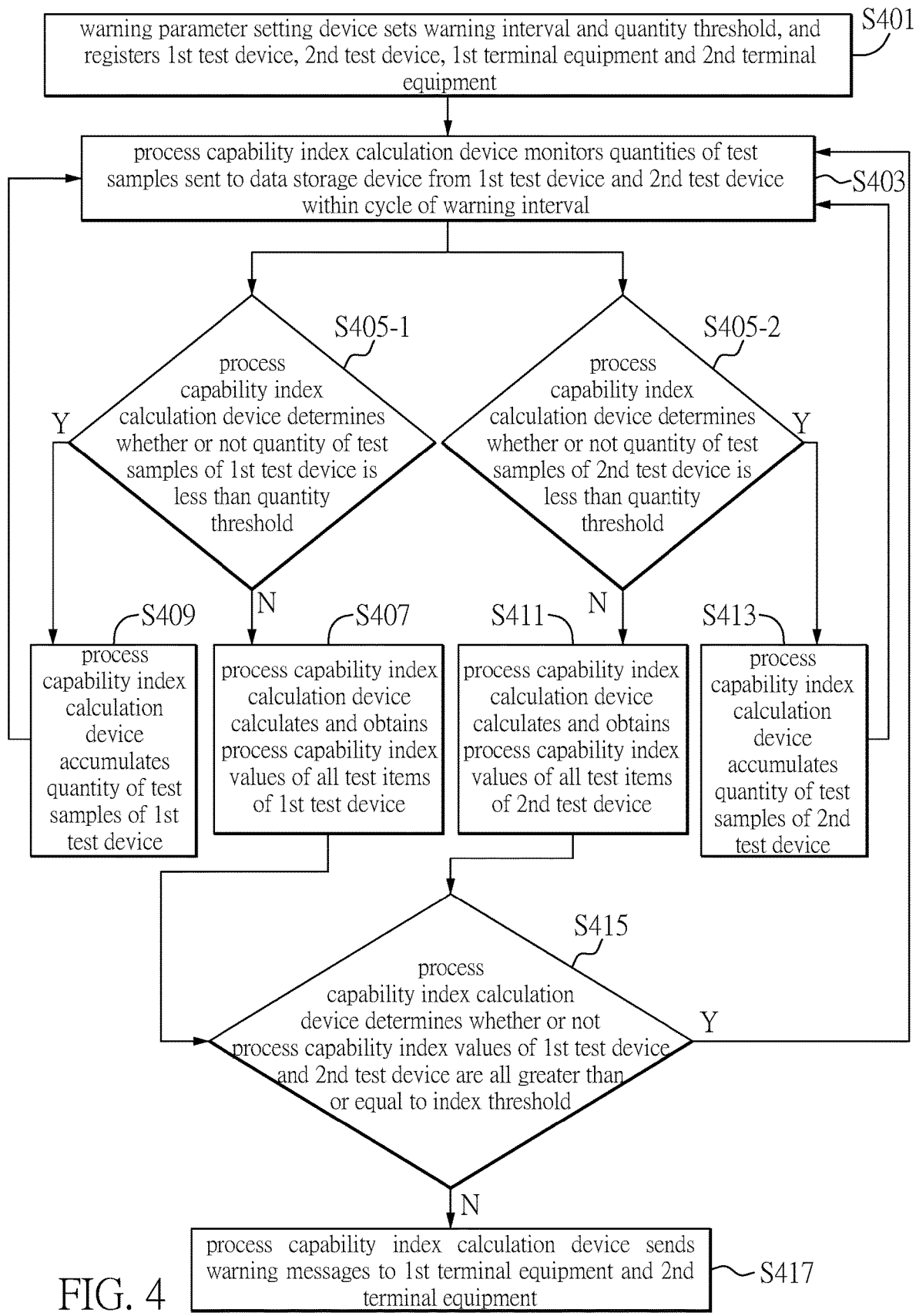
FIG. 4 is a flowchart of a warning method for the process capability index warning system of FIG. 3.

FIG. 4 is a flowchart of a warning method for the process capability index warning system of FIG. 3. As shown in FIG. 4, in step S401, the warning parameter setting device 1 sets the warning interval and the quantity threshold and registers the first test device T1, the second test device T2, the first terminal equipment E1, and the second terminal equipment E2.

In step S403, the process capability index calculation device 3 monitors the quantities of the test samples sent to the data storage device 2 from the first test device T1 and the second test device T2 within a cycle of the warning interval.

In step S405-1, the process capability index calculation device 3 determines whether or not the quantity of the test samples of the first test device T1 is less than the quantity threshold. When the quantity of the test samples of the first test device T1 is not less than the quantity threshold, the warning method proceeds to step S407. When the quantity of the test samples of the first test device T1 is less than the quantity threshold, the warning method proceeds to step S409. In step S405-2, the process capability index calculation device 3 determines whether or not the quantity of the test samples of the second test device T2 is less than the quantity threshold. When the quantity of the test samples of the second test device T2 is not less than the quantity threshold, the warning method proceeds to step S411. When the quantity of the test samples of the second test device T2 is less than the quantity threshold, the warning method proceeds to step S413.

In step S407, the process capability index calculation device 3 calculates and obtains the process capability index values of all test items of the first test device T1. In step S409, the process capability index calculation device 3 accumulates the quantity of the test samples of the first test device T1, and then the warning method returns to step S403.

In step S411, the process capability index calculation device 3 calculates and obtains the process capability index values of all test items of the second test device T2. In step S413, the process capability index calculation device 3 accumulates the quantity of the test samples of the second test device T2, and then the warning method returns to step S403.

After step S407 and step S411, the warning method proceeds to step S415. In step S415, the process capability index calculation device 3 determines whether or not the process capability index values of the first test device T1 and the second test device T2 are all greater than or equal to the index threshold. When at least one of the process capability index values of the first test device T1 or the second test device T2 is less than the index threshold, the warning method proceeds to step S417. When the process capability index values of the first test device T1 and the second test device T2 are all greater than or equal to the index threshold, the warning method returns to step S403. In step S417, the process capability index calculation device 3 sends the warning messages to the first terminal equipment E1 and the second terminal equipment E2.

Figure 5:
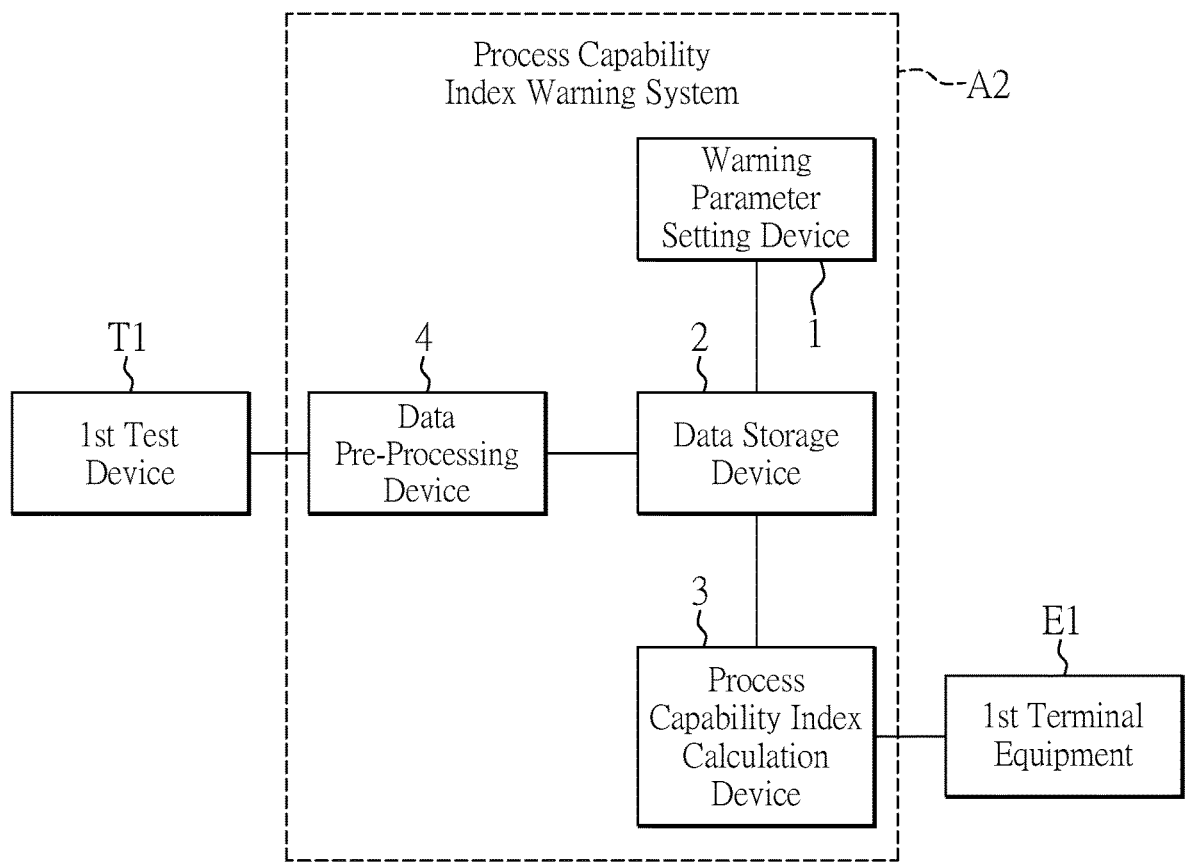
FIG. 5 is a schematic diagram of the process capability index warning system according to a second embodiment of the present disclosure.

FIG. 5 is a schematic diagram of the process capability index warning system according to a second embodiment of the present disclosure. FIG. 5 is compared with FIG. 1, the process capability index warning system A2 in FIG. 5 further includes a data pre-processing device 4, the data pre-processing device 4 is, for example, a server, a personal computer, a laptop computer or a tablet computer, in order to realize the following functional operations.

The data pre-processing device 4 is communicatively connected to the data storage device 2 and the first test device T1. The first test device T1 sends all first test device parameters to the data pre-processing device 4. In addition, the first test device T1 sends one or more test samples to the data pre-processing device 4. The data pre-processing device 4 performs data format conversion on the one or more test samples and the first test device parameters and transmits the converted one or more test samples and the converted first test device parameters to the data storage device 2.

Beneficial Effects of the Embodiments

In conclusion, an insufficient quantity of test samples may cause an occasionally poor performance for a production equipment which may have excellent performance in long term, resulting in serious deviation of the CPK value. Therefore, in the process capability index warning system and the warning method for the same provided by the present disclosure, the CPK value is calculated only after sufficient test samples are accumulated over long-term collection, and thus the calculated CPK value more accurately reflects a current performance of the production equipment. Furthermore, according to the warning message, the operator can analyze the poor CPK value in advance. When the operator arrives at a factory site, parameter settings of the production equipment may be calibrated immediately or parts of the production equipment may be replaced quickly.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A process capability index warning system for monitoring a test device configured to execute a plurality of test items, and the process capability index warning system comprising:
   a warning parameter setting device configured to set a quantity threshold, a warning interval and an index threshold; and
   a process capability index calculation device communicatively connected to the warning parameter setting device, wherein the process capability index calculation device determines whether or not a quantity of test samples of the test device within a present cycle of the warning interval is less than the quantity threshold;

wherein, when the quantity of the test samples is less than the quantity threshold, the process capability index calculation device accumulates the quantity of the test samples until an end of a next cycle of the warning interval;

when the quantity of the test samples is not less than the quantity threshold, the process capability index calculation device calculates and obtains a plurality of process capability index values that correspond to the plurality of test items, and further the process capability index calculation device determines whether or not the plurality of process capability index values is all greater than or equal to the index threshold; and when at least one of the process capability index values is less than the index threshold, the process capability index calculation device sends a warning message.

2. The process capability index warning system according to claim 1, wherein the test device further includes a plurality of test device parameters, and the test device executes the plurality of test items according to the plurality of test device parameters, and the plurality of test items includes a first test item and a second test item, when the process capability index value of the first test item is less than the index threshold and the process capability index value of the second test item is greater than or equal to the index threshold, the warning message includes the first test item, the process capability index value of the first test item, and the test device parameters corresponding to the first test item.

3. The process capability index warning system according to claim 1, wherein, when the quantity of the test samples of the test device within a first cycle of the warning interval is less than the quantity threshold, the process capability index calculation device accumulates the test samples until an end of a second cycle of the warning interval, and when a sum of the test samples within the first cycle and the second cycle of the warning interval is greater than or equal to the quantity threshold, the process capability index calculation device calculates and obtains the process capability index values of the test device.

4. The process capability index warning system according to claim 1, further comprising: a data storage device communicatively connected to the process capability index calculation device, wherein the data storage device stores the test samples of the test device and a plurality of test device parameters of the test device.

5. The process capability index warning system according to claim 4, further comprising: a data pre-processing device communicatively connected to the data storage device, wherein the data pre-processing device performs data format conversion on the test samples and the test device parameters of the test device.

6. A method for a process capability index warning system for monitoring a test device configured to execute a plurality of test items, and the method comprising:

setting, by a warning parameter setting device, a quantity threshold, a warning interval and an index threshold;

determining, by a process capability index calculation device, whether or not a quantity of test samples of the test device within a present cycle of the warning interval is less than the quantity threshold;

accumulating, by the process capability index calculation device, the test samples until an end of a next cycle of the warning interval in response to the quantity of the test samples within the present cycle of the warning interval less than the quantity threshold;

calculating and obtaining, by the process capability index calculation device, a plurality of process capability index values that corresponds to the plurality of test items in response to the quantity of the test samples within the present cycle of the warning interval greater than or equal to the quantity threshold; and determining, by the process capability index calculation device, whether or not the plurality of process capability index values is all greater than or equal to the index threshold;

wherein, when at least one of the process capability index values is less than the index threshold, the process capability index calculation device sends a warning message.

7. The warning method according to claim 6, further comprising: storing, by a data storage device, the test samples of the test device and a plurality of test device parameters of the test device before determining whether or not the quantity of test samples of the test device within the present cycle of the warning interval is less than the quantity threshold.

8. The warning method according to claim 6, wherein the test device further includes a plurality of test device parameters, the plurality of test items includes a first test item and a second test item, when the process capability index value of the first test item is less than the index threshold and the process capability index value of the second test item is greater than or equal to the index threshold, the warning message includes the first test item, the process capability index value of the first test item, and the test device parameters corresponding to the first test item.

9. The warning method according to claim 7, further comprising:

performing, by a data pre-processing device, data format conversion on the test samples and the test device parameters of the test device before the data storage device stores the test samples and the test device parameters.

10. The warning method according to claim 6, further comprising:

in response to the quantity of the test samples of the test device within a first cycle of the warning interval less than the quantity threshold, accumulating, by the process capability index calculation device, the test samples until an end of a second cycle of the warning interval; and in response to a sum of the test samples within the first cycle and the second cycle of the warning interval greater than or equal to the quantity threshold, calculating and obtaining, by the process capability index calculation device, the process capability index values of the test device.

* * * * *